United States Patent [19]
Peterson et al.

[11] Patent Number: 6,154,378
[45] Date of Patent: Nov. 28, 2000

[54] POLYPHASE INVERTER WITH NEUTRAL-LEG INDUCTOR

[75] Inventors: William Anders Peterson, Vestal, N.Y.; Michael Francis Thompson, Columbia, Md.

[73] Assignee: Lockheed Martin Corporation, Johnson City, N.Y.

[21] Appl. No.: 09/274,557

[22] Filed: Mar. 23, 1999

Related U.S. Application Data

[60] Provisional application No. 60/083,419, Apr. 29, 1998.

[51] Int. Cl.[7] ........................ H02M 5/458; H02M 7/5387
[52] U.S. Cl. .............................................. 363/37; 363/132
[58] Field of Search .................................. 363/37, 39, 40, 363/41, 131, 132

[56] References Cited

U.S. PATENT DOCUMENTS

| | | | |
|---|---|---|---|
| 4,667,173 | 5/1987 | Okochi | 333/177 |
| 4,719,557 | 1/1988 | Forstbauer et al. | 363/79 |
| 4,922,400 | 5/1990 | Cook | 363/37 |
| 5,414,612 | 5/1995 | Bjorklund et al. | 363/35 |
| 5,852,558 | 12/1998 | Julian et al. | 363/132 |

OTHER PUBLICATIONS

System Design Considerations for a High–Power Aerospace Resonant Link Converter, T.M.Jahns et al, IEEE Transactions of Power Electronics, vol. 8, No.4, Oct. 1993.

Analysis and Comparison of Space Vector Modulation Schemes for a Four–Leg Voltage Source Inverter, V.H.Prasad et al., APEC '97, vol. 2 Conference Proceedinds, pp. 864–871, Feb. 1997.

*Primary Examiner*—Peter S. Wong
*Assistant Examiner*—Rajnikant B Patel
*Attorney, Agent, or Firm*—Geoffrey H. Krauss; William H. Meise

[57] ABSTRACT

A polyphase AC-to-AC inverter (300) for driving a polyphase load (50), which may be an unbalanced load, includes a wye-connected AC voltage source (12) having a neutral terminal (312). The source (12) is coupled to a rectifying arrangement (16) for producing direct voltage across a direct-voltage bus (22). A capacitive bridge (24) on the DC bus (22) has a tap (26) connected to the neutral (312) of the source. The capacitive bridge is isolated from the AC source harmonics by a zero sequence inductor (20). The DC bus voltage at the capacitive bridge feeds a polyphase switching bridge (40). The average voltage at the output of the switching bridge is recovered by a low-pass filter (30) connected to the load. The unbalanced load current is conducted through an inductor to the capacitive bridge tap and the source neutral, with the inductor impedance isolating the load neutral from the DC bus. The switching bridge control can introduce triplen harmonics in the output to increase line-to-line output voltage.

14 Claims, 6 Drawing Sheets

POLYPHASE INVERTER WITH NEUTRAL-LEG INDUCTOR

This patent application claims priority of Provisional patent application Ser. No. 60/083,419, filed Apr. 29, 1998.

FIELD OF THE INVENTION

This invention relates to polyphase DC-to-AC power inverters.

BACKGROUND OF THE INVENTION

Direct-current-to-alternating-current (DC-to-AC) inverters are widely used in portable systems, uninterruptible power supplies, and the like. There are uses for converting variable-frequency AC voltages, such as obtained from a variable-speed engine (as, for example, where the engine of an airplane rotates at a speed determined by the aircraft's airspeed, and its alternator also rotates at a corresponding speed) to fixed-frequency AC voltages, which may be single-phase or polyphase AC. In such cases, conversion is generally realized by first rectifying the variable-frequency AC to a DC voltage, and then inverting the DC into a fixed-frequency AC with a static inverter. Such an arrangement for a Variable Speed Constant Frequency (VSCF) drive has substantial advantages over mechanical constant-speed drives or rotating motor-generator sets. The output voltage of such a VSCF may be a three-phase output, where the load can be either a single 3-phase load or multiple single-phase loads (although with multiple independent single-phase loads the like-numbered independent single-phase currents can not be guaranteed to be balanced and the neutral connection must be capable of supplying any resulting difference currents).

Figure 1:
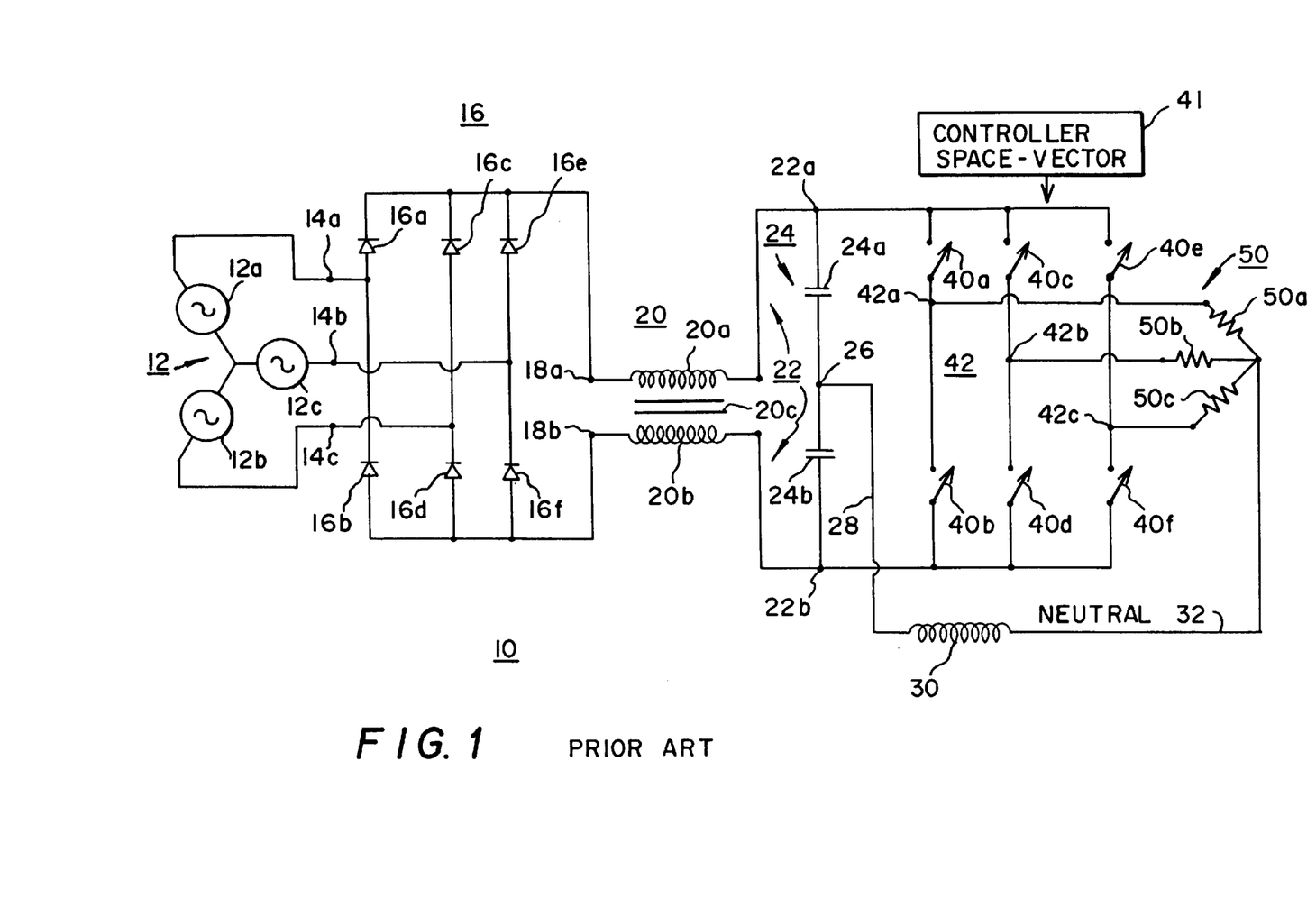
FIG. 1 is a simplified diagram, in block and schematic form, of a prior-art polyphase AC-to-AC inverter.

FIG. 1 is a simplified diagram of a prior-art AC-to-AC inverter 10. In FIG. 1, a polyphase generator 12, illustrated as three separate sources 12a, 12b and 12c, is connected in a wye configuration with three terminals 14a, 14b, and 14c, each of which is respectively connected to the associated diodes or rectifiers of a polyphase rectifier bridge 16. In keeping with the illustration of the polyphase source 12 as being a three-phase source, the rectifier bridge 16 is illustrated as being a 6-pulse rectifier, having a first diode 16a with its anode connected to AC terminal 14a and its cathode connected to pulsating direct voltage terminal or bus 18a, and a second diode 16b having its cathode connected to AC terminal 14a and its anode connected to pulsating direct voltage bus or terminal 18b. Rectifier bridge circuit 16 also includes: a third diode 16c having its anode connected to AC terminal 14b and its cathode connected to pulsating direct voltage terminal or bus 18a; a fourth diode 16d having its cathode connected to AC terminal 14b and its anode connected to pulsating direct voltage bus or terminal 18b; a fifth diode 16e having its anode connected to AC terminal 14c and its cathode connected to pulsating direct voltage terminal or bus 18a; and a diode 16f having its cathode connected to AC terminal 14b and its anode connected to pulsating direct voltage bus or terminal lab.

The DC voltage produced across bus terminals 18a and 18b by rectifier 16 is connected between a positive input bus 22a and a negative input bus 22b of a DC-to-AC inverter 40. A polyphase switching circuit, illustrated as a three-phase circuit including first, second, and third switching half-bridges, is coupled across conductors 22a and 22b of the direct-voltage bus. The first switching half-bridge includes series-connected controlled switches 40a and 40b connected across conductors 22a and 22b, with a first output voltage terminal 42a at the juncture of the switches 40a and 40b. The switches are controlled in a complementary manner, by a controller 41, to connect the output terminal 42a to either the positive DC voltage bus 22a or the negative DC voltage bus 22b. The second switching half-bridge includes series-connected controlled switches 40c and 40d connected across conductors 22a and 22b, with a second output voltage terminal 42b at the juncture of switches 40c and 40d. These switches are also controlled in a complementary manner, by controller 41, to connect the output terminal 42b to either the positive DC voltage bus 22a or the negative DC voltage bus 22b. Finally, the third switching half-bridge includes series-connected controlled switches 40e and 40f connected across conductors 22a and 22b, with a third output voltage terminal 42c at the juncture of the switches 40e and 40f. These switches are also controlled in a complementary manner, by controller 41, to connect the output terminal 42c to either the positive DC voltage bus 22a or the negative DC voltage bus 22b.

While the instantaneous voltage at any one of the output terminals 42 is always either the positive DC voltage on bus 22a or the negative DC voltage on bus 22b, the average voltage at that terminal can be anywhere in between these two values, depending on the switch-closure pulse widths. The switching frequency of switching bridge 40 is at a substantially higher frequency than the desired ac output voltage. Output filter 30 connects the output of the switching bridge 40 to the load 50 and averages the pulse widths to recover this value. Switching half-bridge terminal 42a is connected through an inductor 30a to a capacitor 30d and to load 50a, while switching half-bridge terminal 42b is connected through a different inductor 30b to a second capacitor 30e and to load 50b, with switching half-bridge terminal 42c being connected through another inductor 30c to a third capacitor 30f and to load 50c. The load impedances are connected together at a neutral terminal or line 32, along with the end of each of capacitors 30d, 30e and 30f not connected to one of terminals 42. Neutral line 32 is connected to a tap 26 on a capacitor half-bridge 24, which includes a pair of capacitors 24a and 24b connected in series across the direct voltage buses 22a and 22b. The series connection of capacitors 24a and 24b provides a conduction path for the flow of switching currents from switching inverter 40, with the connection to midpoint terminal 26 providing a path for the flow of the neutral switching currents and any unbalanced fundamental currents.

In operation of the arrangement of FIG. 1, polyphase alternator 12 produces alternating voltage, at a frequency proportional to the speed of the rotor. This voltage is rectified by rectifier 16 to produce pulsating direct voltage across terminals 18a and 18b. The switches of switching bridge circuit 40 are controlled by controller 41, as known in the art, to produce pulse-width modulated high-frequency waveforms at AC output terminals 42. Output filter 30 removes the high frequency part and recovers the low frequency ac voltage to the load 50. The method of control of the switches by controller 41 may be of many different methods including sine triangle modulation, hysteretic modulation, sliding mode control, and many other methods as is well known to those skilled in the art. Space vector modulation, with its benefits of increased output voltage, can not be used in this arrangement, since the triplen harmonics generated by space-vector switching cannot be developed at the neutral 32.

The switching of the switches in bridge 40 produces switching frequency currents in capacitors 24. In the arrangement of FIG. 1 capacitors 24a and 24b must be dimensioned not only to filter the high frequency switching currents from switching bridge 40 but also to conduct any low output frequency unbalanced component of load current. The output frequency being substantially lower than the switching frequency and the effect of the impedance of capacitors 24a and 24b being effectively in parallel, causes an output voltage unbalance to be produced by the unbalanced currents; this effect dominates the requirements for dimensioning capacitors 24a and 24b, which are determined, in the main, by the requirement for carrying the unbalanced component of the load current, rather than by the requirement for filtering.

Figure 2:
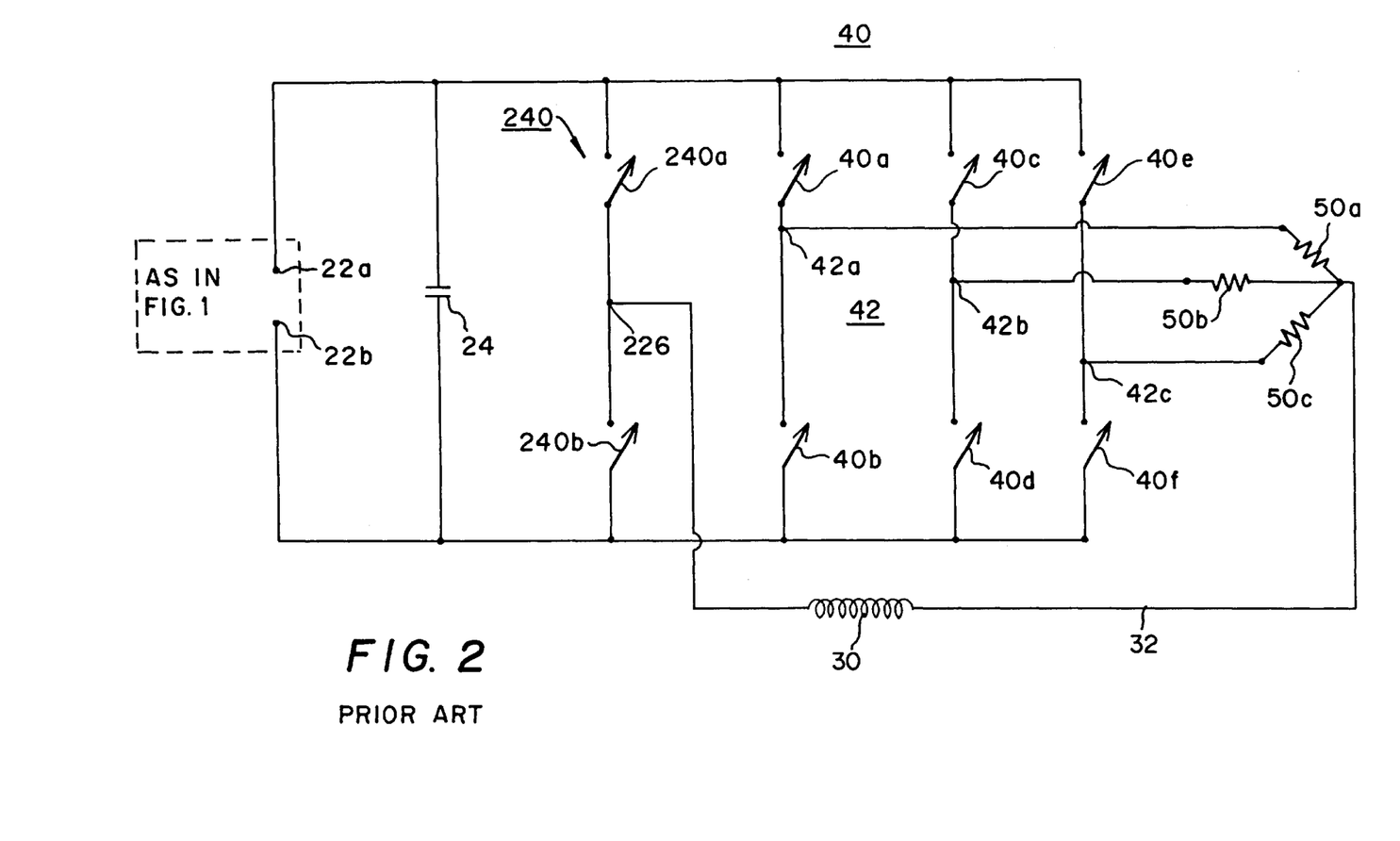
FIG. 2 is a simplified diagram, in block and schematic form, of a portion of another prior-art polyphase AC-to-AC inverter.

FIG. 2 is a simplified diagram of another prior-art polyphase inverter arrangement. The arrangement of FIG. 2 is identical to that portion of FIG. 1 to the left of terminals 22a and 22b, which portion is illustrated in FIG. 2 as a block designated "as in FIG. 1". In the arrangement of FIG. 2, a single filter capacitor 24 is used instead of the split capacitor 24a/24b as in FIG. 1, because there is no need for a capacitor tap. Instead of a capacitor tap, a further controllable switched half-bridge 240 is coupled across the direct voltage bus 22a, 22b. Switched bridge 240 includes a first controllable switch 240a connected in series with a second controllable switch 240b, with a tap 226 at the juncture of the switches. The neutral of the output is returned via inductor 60 to the tap 226 rather than to a capacitive tap.

In operation of the prior-art arrangement of FIG. 2, the rectified direct voltage is generated across terminals 22a and 22b as described in conjunction with FIG. 1, and the switching bridge 40 operates in the same manner, for switching the filtered direct voltage across terminals 22a and 22b to produce the three-phase output voltages. The modulation of switching bridge 240 is controlled to maintain the average voltage at the neutral point 32 at the exact geometric center of the three output phase voltages. The low-pass filter formed by inductor 60 and capacitors 30d, 30e and 30f average the high frequency switching at tap 226 to recover the average voltage. The arrangement of FIG. 2 may have the switches controlled by space vector modulation, as well as any other suitable method of control. For example, an article entitled "A THREE-PHASE INVERTER WITH A NEUTRAL LEG WITH SPACE VECTOR MODULATION", by Zhang et al., published at PP 857–863 of the *Transactions of the* 1997 *IEEE* 12*th Applied Power Electronics Conference,* ISBN 0-7803-37042, describes how space vector modulation may be applied. The triplen harmonics of the space vector modulation are developed across the neutral inductor 60. This arrangement has the disadvantages of requiring an additional switching bridge and its control means, which adds to the cost and complexity, while reducing reliability. It does, however, allow capacitors 24 to be dimensioned only to aid in filtering of the pulsating direct voltage and to return high-frequency components attributable to the switching.

Improved polyphase inverters are desired.

SUMMARY OF THE INVENTION

In accordance with one aspect of the present invention, a polyphase AC-to-AC inverter for driving a polyphase load, which may be unbalanced, includes an AC voltage source including at least first, second, and neutral output terminals (illustratively, a 3-phase, wye-connected source having first, second and third output terminals and a neutral terminal). A rectifying arrangement is coupled to the output terminals (e.g. the first, second, and third output terminals) of the AC voltage source, for producing a direct voltage across a direct-voltage bus. A controlled polyphase switching bridge circuit is coupled across the direct-voltage bus, for generating polyphase voltages across plural (e.g. at least first, second, and third) load voltage terminals. An inductance is connected to the DC bus, coupled in a manner to present a high impedance to common mode, or zero sequence, currents, and to present a low impedance to differential mode, or positive sequence, currents. The inductor is connected to a capacitance bridge that includes a tap connected to the neutral of the AC source and also to the neutral of the output, so that the output neutral is connected to the tap of the capacitance bridge through the neutral leg inductor.

In various embodiments of the invention, the polyphase switching circuit is controlled by a space vector modulator or by a sine-triangle modulator. The sine triangle modulator may include third harmonic injection to increase the magnitude of the output voltage.

Accordingly, it is one object of the present invention to provide an improved polyphase inverter with a neutral leg inductor.

This and other objects of the present invention will become apparent to those skilled in the art, upon reading a detailed description of present preferred embodiments of our invention, when considered in conjunction with the appended drawings.

DETAILED DESCRIPTION OF THE INVENTION

Figure 3A:
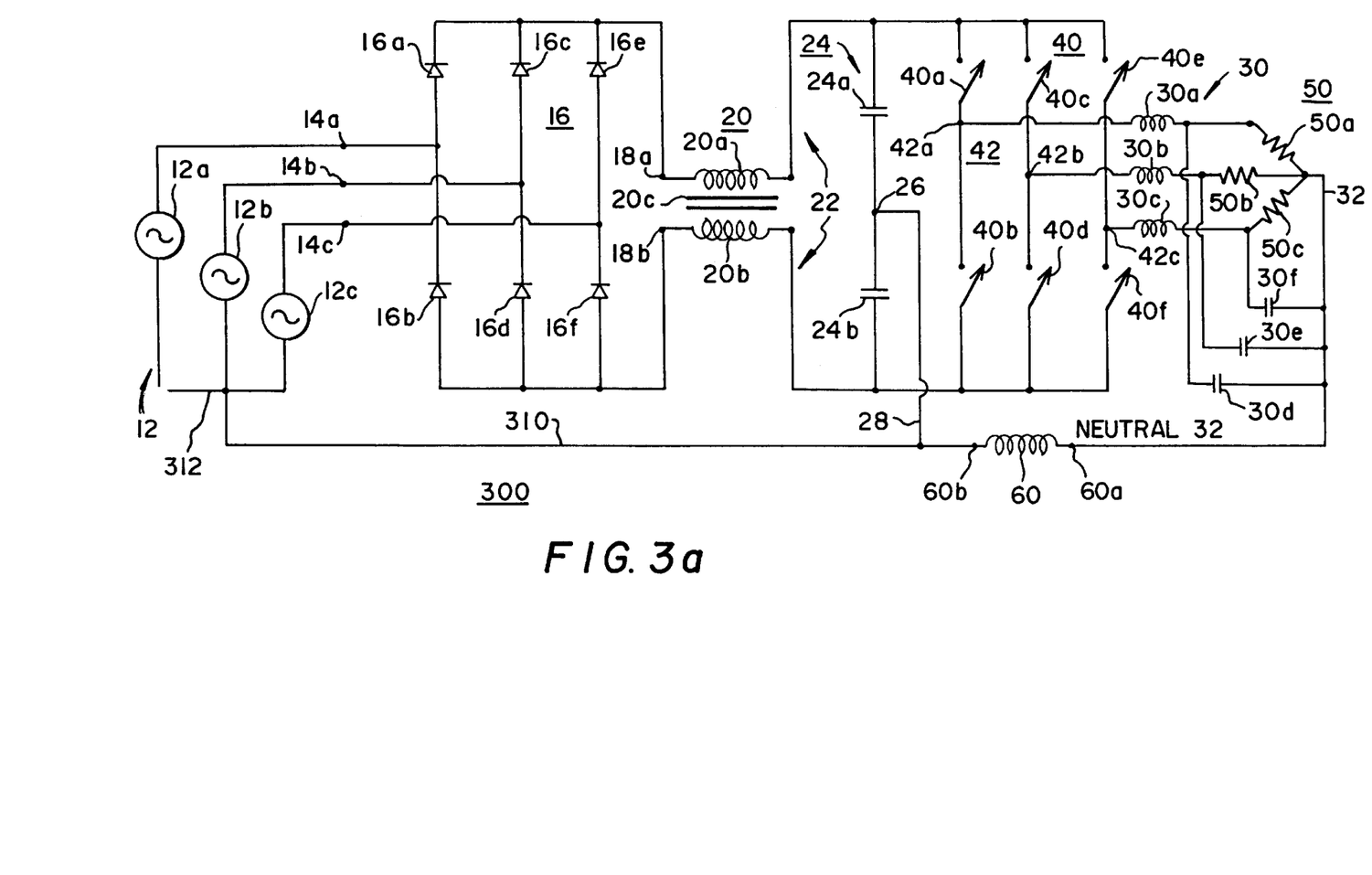
FIGS. 3a and 3b are each a simplified diagram, in block and schematic form, of a polyphase AC-to-AC inverter in accordance with one aspect of the invention.
Figure 3B:
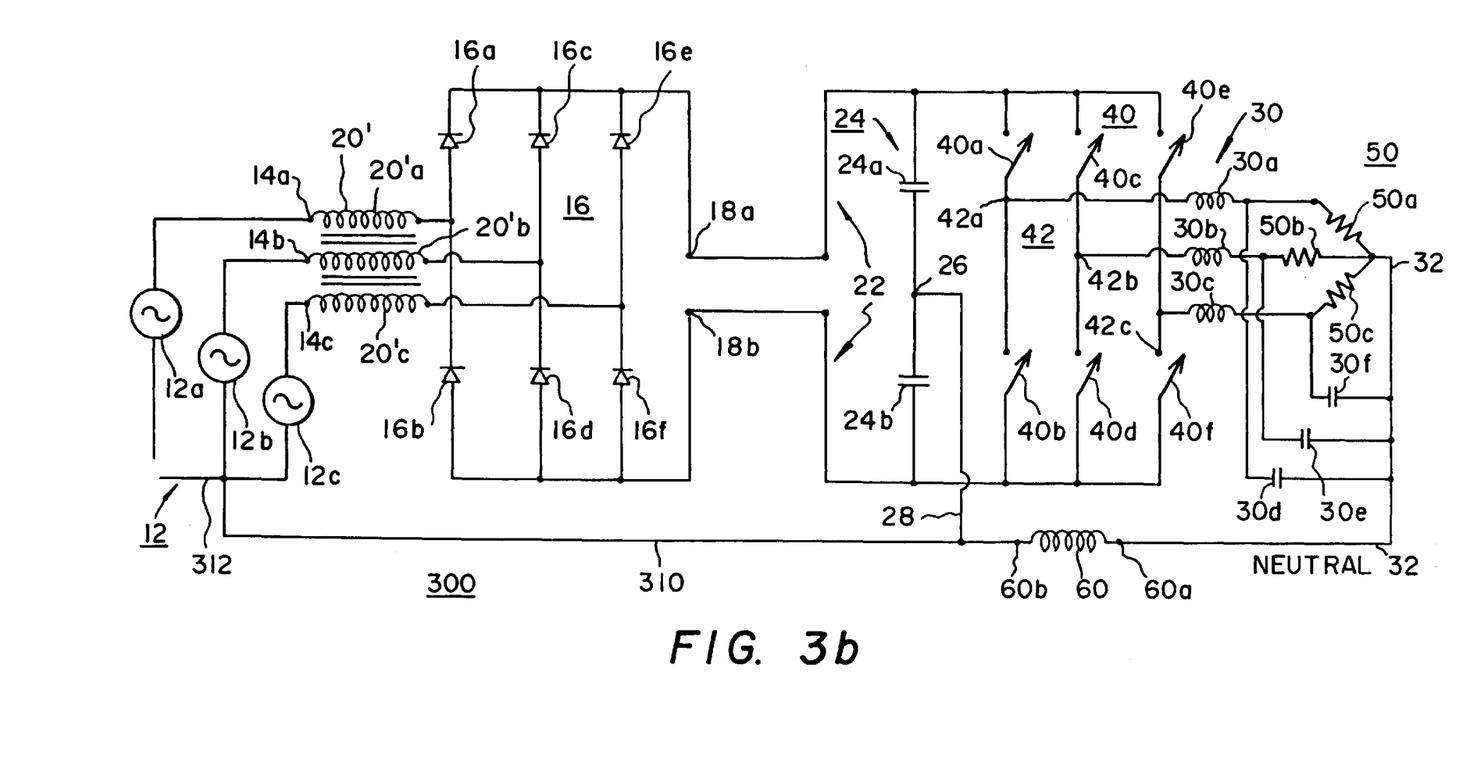

FIGS. 3a and 3b illustrates an AC-to-AC inverter according to one aspect of the present invention. FIGS. 3a and 3b are is topologically similar to FIG. 1, except that a further conductor 310 connects the tap 26 between capacitors 24a and 24b to the neutral connection 312 of polyphase source 12. This connection requires an inductor 20 be interposingly connected between sources 12 and capacitive bridge 24, to prevent generation of alternator zero sequence currents that will result in a high DC link voltage on capacitor bridge 24, along with a poor alternator power factor; the inductor can be placed between rectifier 16 and capacitors 24, as shown by inductor 20, or can be placed between sources 12 and rectifier 16, as shown by alternate-placement inductor 20'. The arrangement of FIGS. 3a and 3b also differs from that of FIG. 1 by the inclusion of inductor 60 in the neutral leg between capacitive bridge tap 26 and output filter neutral connection line 32; it will be seen that this placement and function is topologically similar to that in the circuit of FIG. 2. In another particular, which is in the dimensioning of capacitors 24a and 24b. More particularly, according to an aspect of the invention, capacitors 24a and 24b are dimensioned to allow conduction of the high, switching-frequency components, but not the output fundamental components. Thus, unbalanced load neutral currents cannot return to switching bridge 40 by way of capacitor bridge 24.

In operation of the arrangement of FIGS. 3a ad 3b, unbalanced load currents flow in neutral conductor 32, through inductor 60, to alternator neutral 312. At this point, the neutral currents either are added to or are subtracted from the current being produced by the AC source alternator 12, depending on the instantaneous direction of current flow. These currents return through rectifier bridge 16 and inductor 20 to the switching bridge 40, thereby completing their loop. The path through capacitor 24a and 24b exists in parallel with the path through alternator 12, but with capacitors 24a and 24b dimensioned only for the high-frequency currents, the impedance of this path is relatively high and little of this current flows in it.

Figure 4A:
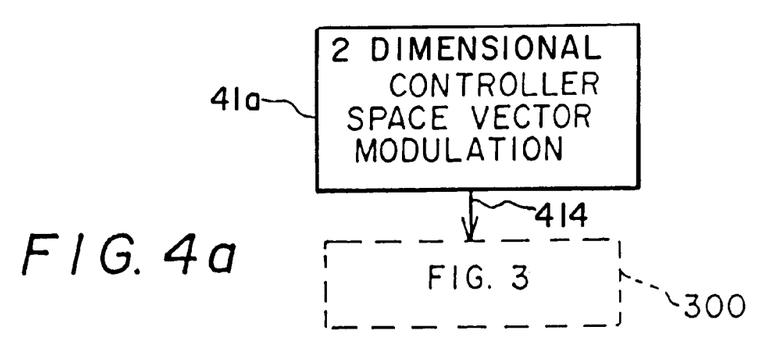
FIGS. 4a–4d are each a simplified representation of the arrangement of FIGS. 3a and 3b with a different type of switching controller.
Figure 4B:
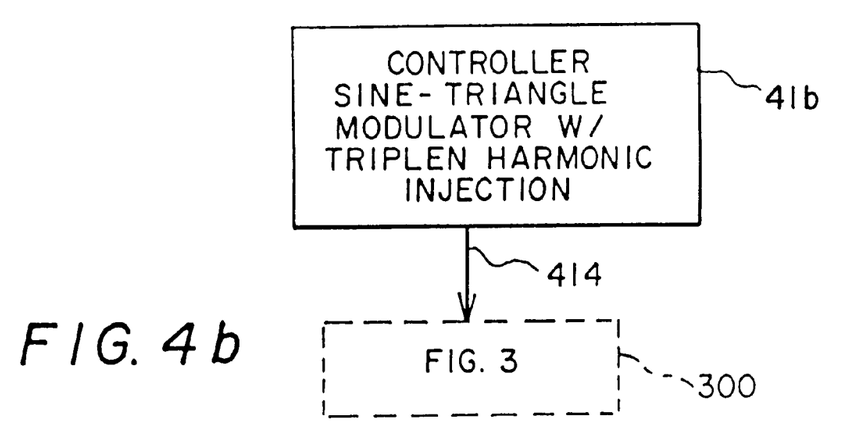
Figure 4C:
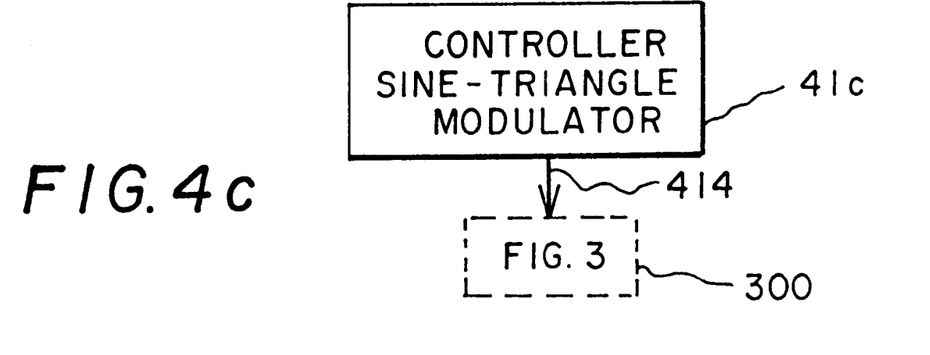
Figure 4D:
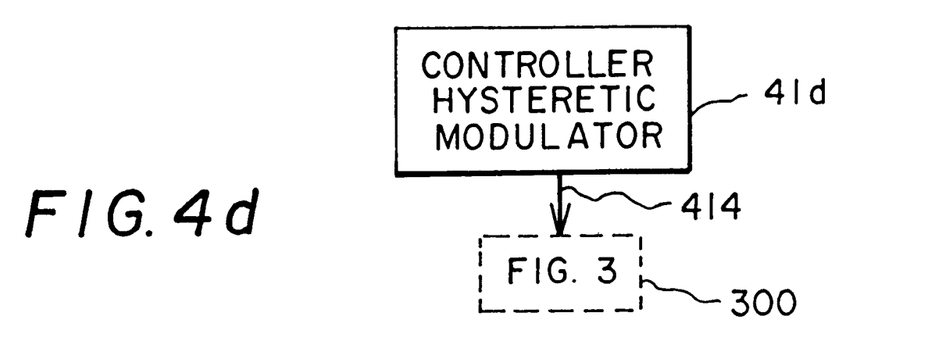

In accordance with one aspect of this invention, the modulator for switching bridge 40 may be a space vector modulator as depicted in FIG. 4a or it may be a sine triangle modulator with third harmonic injection as depicted in FIG. 4b. With either of these types of controllers, the output of switching bridge 40 will produce triplen harmonics of the fundamental, in addition to the fundamental. These triplen harmonics will produce a higher phase-to-phase voltage for a given DC bus voltage 22 and modulation index. The triplen harmonics will appear as a distortion in the phase-to-DC bus voltage. By including inductor 60 between load neutral 32 and capacitor bridge tap 26, these triplen voltage harmonics are developed across this inductor 60 rather than across the load impedance. This operation is similar to the operation of the prior art circuit depicted in FIG. 2. Thus, the switching bridge 40 may be controlled with a modulator 41 that introduces triplen harmonics without the added complexities of an additional switching half-bridge 240 and the complexity of three dimensional space vector modulation required by the prior art depicted in FIG. 2. Additionally, capacitors 24a and 24b need not be dimensioned to provide a low impedance to the fundamental output frequency, since a parallel path for these currents exists through the alternator 12; the capacitors of bridge 24 need not be dimensioned to carry any particular magnitude of current FIGS. 4a–4d illustrate the arrangement 300 of FIG. 3 with a switching bridge controller 41 corresponding to that of FIG. 1, for controlling the switching bridge respectively with: space vector modulation (controller 41a of FIG. 4a); sine-triangle modulation, preferably with triplen harmonic injection (controller 41b of FIG. 4b); conventional controlled sine-triangle modulation (controller 41c of FIG. 4c); or conventional controlled hysteretic modulation (controller 41d of FIG. 4d).

Other embodiments of the invention will now become apparent to those skilled in the art. For example, while both the source of alternating voltage and the switching bridge circuit of the FIGURES are illustrated as being three-phase, they are independent, and need not have the same number of phases.

Thus, according to an aspect of the invention, a polyphase AC-to-AC inverter (300) for driving a polyphase load (50), which may be an unbalanced load, includes a wye-connected AC voltage source (12) including at least first (14a), second (14b), and third (14c) output terminals, and a neutral terminal (312). A rectifying arrangement (16) is coupled to the first (14a), second (14b), and third (14c) output terminals of the AC voltage source (12), for producing direct voltage across a direct-voltage bus (22). A controlled polyphase switching bridge circuit is coupled across the direct-voltage bus (22), for generating polyphase voltages across at least first (42a to 42b), second (42b to 42c), and third (42c to 42a) load voltage terminals. A capacitance bridge (24) is coupled across the direct-voltage bus (22), for at least filtering the direct voltage. The capacitance bridge (24) includes a tap (26). A neutral inductor (60) is coupled to receive the unbalanced currents from the load (50), with a first end (60a) coupled to the neutral conductor (32) of the load, and at a second end (60b) to the tap (26) on the capacitance bridge (24) and to the neutral terminal (312) of the source (12).

In a particular embodiment of the invention, the tap (26) on the capacitive bridge (24) is a center tap. In various embodiments of the invention, the controlled polyphase switching bridge circuit (40) is controlled: by a modulated space vector modulator (41a); by a sine-triangle modulator, which may include triple harmonic injection; by a controlled hysteretic modulator; or any other form of modulator.

What is claimed is:

1. A polyphase AC-to-AC inverter for driving a potentially unbalanced polyphase load having a load neutral terminal from a wye-connected AC voltage source having a least three-phase output terminals and a source neutral terminal, said inverter comprising:

rectifying means, coupled to said at least three source phase output terminals, for producing direct voltage across a direct-voltage bus;

inductor means, interposed between said AC voltage source and said direct-voltage bus, for preventing alternator zero sequence current and isolating any harmonic currents of said AC voltage source;

a polyphase switching bridge circuit coupled across a harmonic-isolated portion of said direct-voltage bus, for generating polyphase voltages at each of at least first, second, and third output terminals, each directly connected to said load, by switching said direct-voltage at a switching frequency at least one order of magnitude greater than a fundamental frequency of the polyphase voltages at said switching bridge circuit output terminals;

a capacitance bridge coupled across said direct-voltage bus, for conducting switching currents from said switching bridge, and having a center tap coupled to said source neutral terminal, said capacitance bridge being effective to allow conduction of high-switching-frequency components of load current but substantially preventing conduction of fundamental-frequency load current component; and neutral inductor means, coupled via a conductor between said load neutral terminal, said source neutral terminal, and said capacitance bridge tap, for conveying unbalanced fundamental-frequency currents from said load.

2. The inverter according to claim 1, wherein said tap is a center tap.

3. The inverter according to claim 1, wherein said switching bridge is a pulse-width-modulated bridge.

4. The inverter according to claim 3, wherein said polyphase switching bridge circuit is controlled by a space vector modulator.

5. The inverter according to claim 3, wherein said polyphase switching bridge circuit is controlled by a sine-triangle modulator.

6. The inverter according to claim 5, wherein sine-triangle modulator includes triplen harmonic injection.

7. The inverter according to claim 1, further including low-pass means, interposed between said output terminals and said load, for filtering out the switching frequency components of the output terminal polyphase voltages, while passing the polyphase voltage fundamental frequency.

8. The inverter according to claim 1, further including controller means for controlling switching of said switching bridge to produce harmonics of said polyphase voltage fundamental frequency.

9. The inverter according to claim 8, wherein said controller means uses space vector modulation.

10. The inverter according to claim 8, wherein said controller means uses sine-triangle modulation.

11. The inverter according to claim 8, wherein said controller means uses sine-triangle modulation with third harmonic injection.

12. The inverter according to claim 1, wherein said AC source has a substantially higher phase count than the phases produced at the output terminals.

13. A polyphase AC-to-AC inverter for driving a potentially-unbalanced polyphase load having a load neutral terminal, from a wye-connected AC voltage source including a plurality of phase-output terminals and a source neutral terminal, said inverter comprising:

a rectifying arrangement coupled to said plurality of source phase-output terminals, for producing direct voltage across a direct voltage bus;

a controlled polyphase switching bridge circuit coupled across said direct-voltage bus, for generating polyphase voltages at a plurality of non-neutral terminals of said load;

a capacitance bridge coupled across said direct-voltage bus, for conducting bridge switching currents, and having a tap;

inductor means operatively connected to said rectifying arrangement for preventing alternator zero sequence currents; and a neutral inductor coupled via a conductor to said source neutral terminal and to said capacitance bridge tap to convey any unbalanced currents from said load neutral terminal to said capacitance bridge tap and to said source neutral terminal.

14. An inverter according to claim 13, wherein said tap is a center tap.

* * * * *